United States Patent
Hermant et al.

(10) Patent No.: US 8,535,570 B2
(45) Date of Patent: Sep. 17, 2013

(54) PROCESS FOR THE PREPARATION OF A CONDUCTIVE POLYMER COMPOSITION

(75) Inventors: Marie Hermant, Eindhoven (NL); Lubertus Klumperman, Eindhoven (NL); Cornelis Koning, Eindhoven (NL); Paul Van Der Schoot, Eindhoven (NL)

(73) Assignee: Stichting Dutch Polymer Institute, Eindhoven (NL)

( * ) Notice: Subject to any disclaimer, the term of this patent is extended or adjusted under 35 U.S.C. 154(b) by 505 days.

(21) Appl. No.: 12/677,947

(22) PCT Filed: Aug. 22, 2008

(86) PCT No.: PCT/EP2008/061040
§ 371 (c)(1),
(2), (4) Date: Oct. 22, 2010

(87) PCT Pub. No.: WO2009/033933
PCT Pub. Date: Mar. 19, 2009

(65) Prior Publication Data
US 2011/0031447 A1    Feb. 10, 2011

(30) Foreign Application Priority Data

Sep. 13, 2007  (EP) .................................. 07116339

(51) Int. Cl.
*H01B 1/06* (2006.01)
(52) U.S. Cl.
USPC .......................................... 252/500; 977/750
(58) Field of Classification Search
USPC ................. 252/500, 511; 528/373, 422, 423; 977/750
See application file for complete search history.

(56) References Cited

U.S. PATENT DOCUMENTS

| 2001/0016303 A1* | 8/2001 | Majumdar et al. ............. 430/529 |
| 2003/0141487 A1* | 7/2003 | Lelental et al. ................ 252/500 |

(Continued)

FOREIGN PATENT DOCUMENTS

| EP | 1 647 566 | 4/2006 |
| EP | 1 777 258 | 4/2007 |

(Continued)

OTHER PUBLICATIONS

Baytron P Al 4083 Product Data Sheet Dec. 22, 2010.*

(Continued)

*Primary Examiner* — Mark Kopec
*Assistant Examiner* — Jaison Thomas
(74) *Attorney, Agent, or Firm* — Nixon & Vanderhye P.C.

(57) ABSTRACT

The present invention relates to a process for the preparation of a conductive polymer composition comprising the steps of A) providing a latex containing a conductive polymer; B) mixing the latex from A with either an aqueous latex of a polymer, or with (a) water-soluble precursor(s) of a polymer; C) removing water from the so obtained mixture; D) heating the product from step C) to a temperature at which the polymer added in step B flows or where the polymer introduced in step B is formed from out of its precursor(s); and E) processing and/or solidifying the product of step D) into a desired form, wherein the amount of conductive polymer is between 0.1 and 10 wt % relative to the total of the total of components in step A and B. In step A optionally carbon nanotubes (CNTs) in an aqueous medium are preferably added to the latex containing conductive polymer. In that case the conductive polymer may behave as a conductive polymeric surfactant for the CNTs dispersed in water.

12 Claims, 2 Drawing Sheets

Size exclusion chromatogram for PS prepared via conventional free radical emulsion polymerization.

(56) References Cited

U.S. PATENT DOCUMENTS

| | | |
|---|---|---|
| 2004/0127637 A1 | 7/2004 | Hsu et al. |
| 2005/0224765 A1 | 10/2005 | Hsu et al. |
| 2007/0004899 A1 | 1/2007 | Hsu et al. |
| 2011/0135939 A1* | 6/2011 | Isaji et al. ............ 428/428 |

FOREIGN PATENT DOCUMENTS

| | | |
|---|---|---|
| EP | 1 777 259 | 4/2007 |
| WO | 2004/029128 | 4/2004 |
| WO | WO 2004/029128 | 4/2004 |
| WO | 2004/072159 | 8/2004 |
| WO | WO 2004/072159 | 8/2004 |
| WO | 2004/097853 | 11/2004 |
| WO | WO 2004/097853 | 11/2004 |
| WO | 2005/090435 | 9/2005 |
| WO | 2005/090436 | 9/2005 |
| WO | WO 2005/090435 | 9/2005 |
| WO | WO 2005/090436 | 9/2005 |
| WO | 2009/033933 | 3/2009 |

OTHER PUBLICATIONS

International Search Report for PCT/EP2008/061040, mailed May 7, 2009.

* cited by examiner

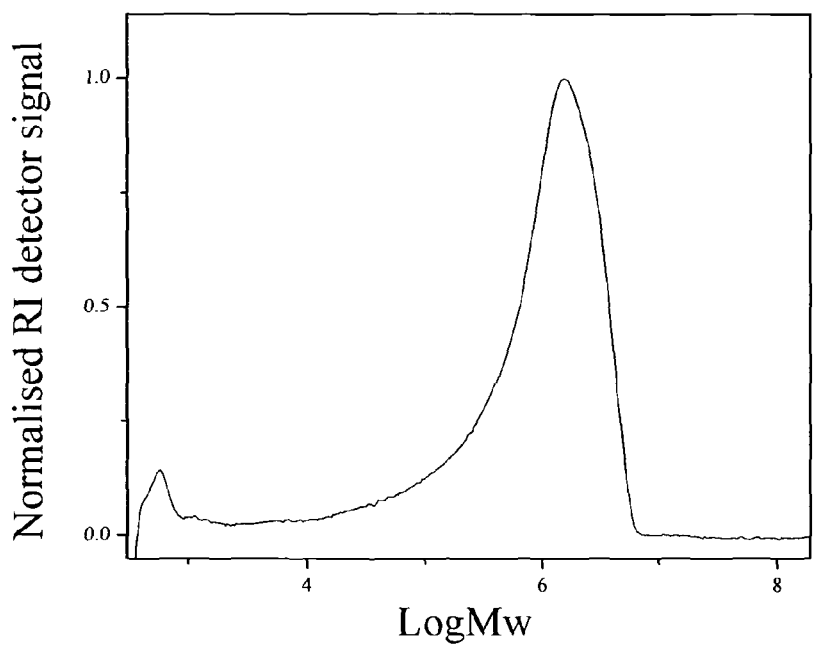
Figure 1    Size exclusion chromatogram for PS prepared via conventional free radical emulsion polymerization.
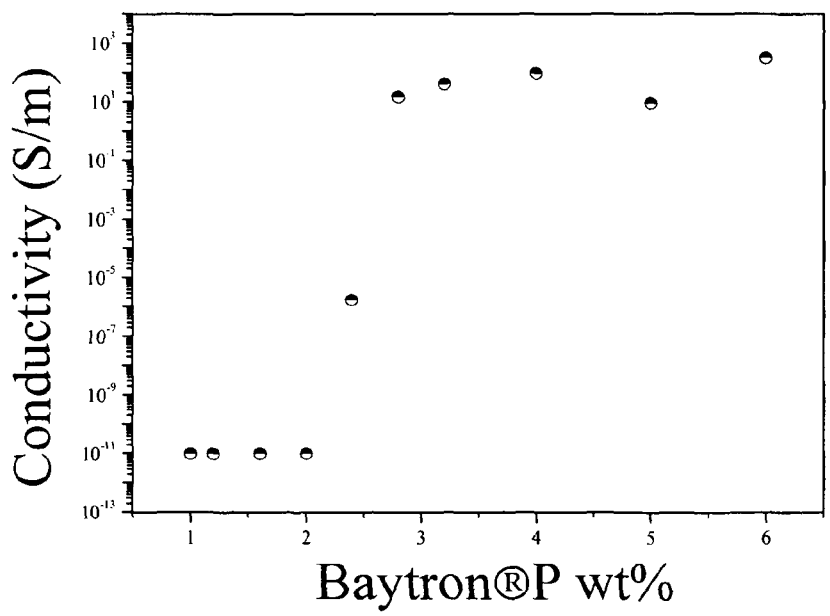
Figure 2    Conductivity profile for Baytron®P/PS blends with varying fractions of conductive polymer

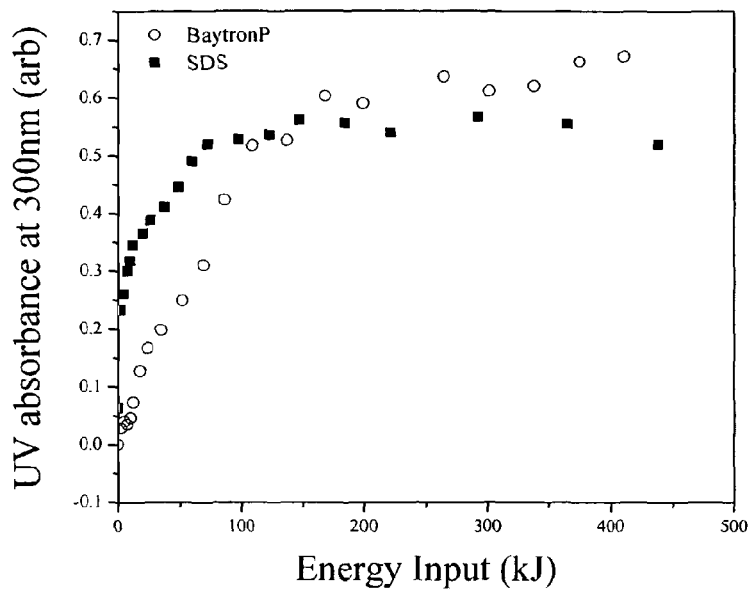
Figure 3  Sonication profile for 0.1 wt% SWNT dispersions stabilized with SDS (0.4 wt%) (squares) and Baytron®P (0.4 wt%) solutions (circles).
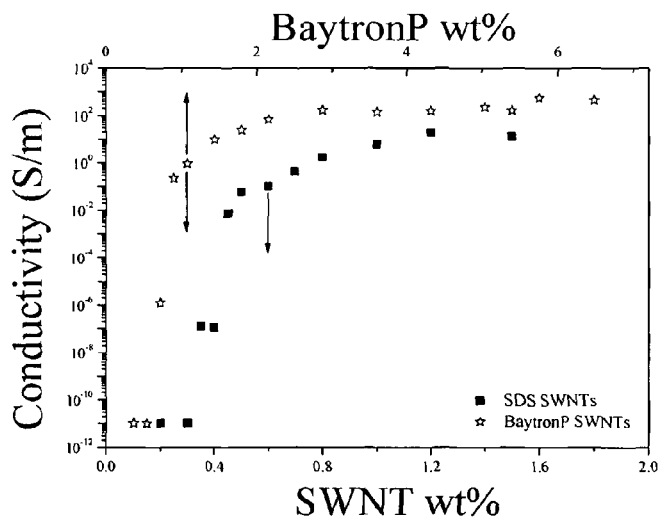
Figure 4  Conductivity profile for SWNT – PS composites made using SDS (squares) and Baytron®P (stars) stabilized SWNTs. The arrows indicate the appropriate X axis.

PROCESS FOR THE PREPARATION OF A CONDUCTIVE POLYMER COMPOSITION

This application is the U.S. national phase of International Application No. PCT/EP2008/061040 filed 22 Aug. 2008, which designated the U.S. and claims priority to EP Application No. 07116339.8 filed 13 Sept. 2007, the entire contents of each of which are hereby incorporated by reference.

FIELD

The present invention relates to a process for the preparation of a conductive polymer composition. The present invention further relates to the conductive polymer composition obtainable by the process of the present invention. The present invention also relates to the use of the conductive polymer composition.

BACKGROUND AND SUMMARY

In recent years, much effort has been put into the preparation of conductive polymers. In WO-A 2004/072159 a polymer latex-based process is disclosed for the preparation of a conductive composition or polymer nano-composite using carbon nanotubes (CNTs) as filler. The carbon nano-tubes are exfoliated and stabilized by the use of water soluble surfactant, for example sodium dodecyl sulphate (SDS), forming a stable homogeneous dispersion, which is further mixed with a polymer latex followed by water removal and melt processing. A homogeneous dispersion of the CNTs in a polymer matrix, formed from the former latex particles, results in an improved stiffness, strength and conductivity of the final polymer nano-composites. The process provides carbon nanotubes reinforced polymers having a percolation threshold at significantly lower loading of the CNTs compared to other mixing techniques. With percolation threshold is meant the amount of CNT needed to retrieve a significant increase in the electrical conductivity of the polymer nano-composites.

The water soluble surfactant, for example SDS, which is often used in practice to stabilize the aqueous dispersion of the exfoliated CNTs, performs excellently as a stabilizing additive but lacks thermal stability which leads to problems during processing of the conductive polymer composition at elevated temperatures. Moreover SDS is a plasticizer for several polymers and therefore lowers the glass transition temperature of the final polymer composite.

It is also known in the art to prepare a conductive coating from a conductive polymer composition by mixing a latex of a conductive polymer (like for example Baytron® or sulphonated polystyrene-stabilised (poly(3,4-ethylenedioxythiophene)) with a non-conductive polymer. The required amount of Baytron in a typical latex composition which is used to make a conductive coating exceeds 24 wt %. These high amounts of conductive polymer make the coating very expensive, sensitive to degradation and the mechanical properties of the coating cannot easily be modified.

There is thus a continuous need to improve the conductivity of polymers or to lower the percolation threshold of polymer nano-composites without being confronted with the above disadvantages.

The aim of the invention is to provide a process for the preparation of a conductive polymer composition or polymer nano-composite which shows a low percolation threshold and/or a high conductivity. It is a further aim of the present invention to provide a conductive polymer composition or polymer nano-composite with improved thermal stability.

This aim is achieved in that the process of the present invention comprises the steps of
A) Providing a latex containing a conductive polymer (A);
B) mixing the latex from A with an aqueous latex of a polymer (B) or with (a) water-soluble precursor(s) of a polymer;
C) removing water from the so obtained mixture;
D) heating the product from step C) to a temperature at which the polymer (B) flows or where the polymer introduced in step B is formed from out of its precursor(s); and
E) processing and/or solidifying the product of step D) into a desired form, wherein the amount of conductive polymer (A) is between 0.1 and 10 wt % relative to the total of all components in step A and B, except for water.

BRIEF DESCRIPTION OF THE DRAWINGS

FIG. 1 is a size exclusion chromatogram for polystyrene (PS) via a conventional free radical emulsion polymerization;

FIG. 2 is a conductivity profile of a polythiophene (Baytron®P)/polystyrene blend with varying fractions of conductive polymer;

FIG. 3 is a sonication profile for 0.1wt% of single wall nanotube (SWNT) dispersions stabilized with sodium dodecyl sulphate (SDS) (0.4wt.%) (squares) and polythiophene (Baytron®P) (0.4wt.%) solutions (circles); and FIG. 4 is a conductivity profile for SWNT-PS composites made using SDS (squares) and polythiophene (Baytron®P) (stars) stabilized SWNTs, with arrows indicating the appropriate X-axis;

DETAILED DESCRIPTION

The wt % of a component is here and hereinafter defined as the weight % of a component relative to all components present in (A) and (B), except for water, unless explicitly stated otherwise.

In the process of the present invention a conductive polymer is used which provides a conductive polymer composition or polymer nano-composite with a lower percolation threshold and/or a higher conductivity than thus far achieved. Furthermore the properties of the conductive polymer composition or polymer nano-composite at elevated temperatures are not affected. Moreover in the preparation of conductive coatings lower amounts of conductive polymer are required making the coating less expensive.

The steps of the process of the present invention will be separately discussed below.

In step A, a latex containing a conductive polymer (A), optionally containing a suitable doping agent, is provided which is contacted with B) an aqueous latex of a polymer (B).

Examples of intrinsically conductive polymers (A) are poly(3,4-ethylenedioxythiophene), poly(3,4-ethylenedioxythiophene) poly(styrenesulfonate) which are commercially available as BAYTRON®, BAYTRON® P and polyphenylene-vinylenes, general polythiophenes, polyaniline, polypyrrole or polyacetylene. Preferably poly(3,4-ethylene-dioxy-thiophene) poly(styrenesulfonate) is used as conductive polymer.

The conductive polymer (A) is used in an amount between 0.1 and 10 wt %. Preferably the conductive polymer (A) is used in an amount between 0.1 and 5 wt %.

In a preferred embodiment of the present invention, carbon nanotubes are added in step A. It is preferred to contact the latex containing conductive polymer (A) with the carbon nanotubes (CNTs) in an aqueous medium to exfoliate and stabilize the CNTs before this mixture is contacted with B) an aqueous latex of a polymer (B). The latex B contains the polymer (B) that constitutes the matrix of the composite containing CNT and conductive polymer (A). The CNTs are preferably exfoliated and well dispersed in the matrix.

Carbon nanotubes (CNTs) are allotropes of carbon. There are two main types of nanotubes: single-walled nanotubes (SWNTs) and multi-walled nanotubes (MWNTs). A single wall carbon nanotube is a one-atom thick graphene sheet of graphite (called graphene) rolled up into a seamless cylinder with diameters of the order of a nanometer. This results in a nanostructure where the synthesized length-to-diameter ratio may exceed 1000. Multi-walled nanotubes (MWNT) consist of multiple layers of graphite rolled in on themselves to form a tube shape.

In the process of the present invention the use of SWNTs is preferred, as it usually results in a much lower wt % of the CNTs needed for obtaining the percolation threshold of the polymer nano composite, compared to the use of MWNTs. This lower loading also improves the mechanical and flow properties of the final polymer nano composite.

In this way it has surprisingly been found that the conductive polymer (A) behaves as a conductive polymer surfactant, very efficient in stabilizing an aqueous dispersion of exfoliated carbon nanotubes. It has been found that by replacing conventional non-conductive SDS surfactant by a conductive polymer surfactant, the percolation threshold of the final polymer/CNT composite is lowered with at least 25%.

It has also been found that the maximum conductivity achievable with the composite containing the conductive polymer stabilised SWNTs is at least 100 S/m which is significantly higher than that of corresponding composites prepared with SDS stabilised SWNTs for which the same polymer latex was used.

In case that the conductive polymer (A) is used to exfoliate the CNTs, the mass ratio conductive polymer (A) to CNTs is for example between 1-10, preferably between 3-9. The resulting product may for example contain up to 5 weight % of carbon nanotubes coated with the conductive polymeric surfactant. Preferably the amount of CNT ranges between 0.1 and 2 wt %, more preferably the amount of CNT ranges between 0.2 and 1.5 wt %.

The temperature at which this step A is performed is not critical. Temperatures between room temperature and 75° C. are very well suited.

The residence time needed for an effective exfoliation of the carbon nanotubes can be easily determined by a man skilled in the art. If no CNTs are used step B is equal to step A as described above namely contacting the latex containing conductive polymer with an aqueous latex of a polymer.

Every aqueous latex of a polymer (B) known to the skilled man can be introduced in step B. Examples are a latex from thermoset polymers or a latex from thermoplastic polymers. Preference is given to a polymer being selected from the group comprising polyacrylates, styrene-based (co-)polymers, butadiene-based (co-)polymers, polycarbonate, acrylonitrile-based (co-)polymers, (halogen-containing) polyolefins (like polyethylene or polypropylene), polyamides, polyvinylchloride, polyurethane or PTFE.

Also (a) precursor(s) of the polymer can be used, as they are, or in the form of an aqueous solution thereof which can be converted to the polymer for example via an emulsion polymerization. Preference can be given, for instance when a nylon is used as the polymer, to the use in this step B of either the monomer of said polymer (like ϵ-caprolactam when using nylon 6 as the final matrix material), or to the use of a salt of adipic acid and hexamethylene diamine, or diaminobutane, when nylon 6,6 or nylon 4,6 as the polymer is aimed at. The skilled man is aware of the precursor(s) needed for such a polymer. Preference is given to the use of ((a) precursor(s) of) a polyamide or a polystyrene based polymer in step B.

The percolation threshold of CNTs (preferably SWNTs), in the final conductive polymer composition depends largely on the original percolation in the dispersed state i.e. the processing step in which a CNT dispersion is added to the aqueous polymer latex in step B. Several factors may influence the organization of the CNTs in the dispersion, for example the relative sizes of the two dispersed structures (rod-like SWNTs and spherical polymer particles), the surface ionic strength (or surface coverage with surfactant) and the concentration of both structures. Without wanting to be bound to any theory, the inventors believe that the present method of applying CNTs and a conductive polymer (A) generates more efficiently a conducting network, with conductive polymer bridges between adjacent CNTs. The inevitable presence of polymer (B) between adjacent CNTs is assumed to increase the non-contact resistivity of the CNTs. By introducing a conductive bridge, the electron hopping between tubes will be facilitated.

The temperature in step B generally lies between 10 and 150° C. The pressure is generally atmospheric, but may be increased in order to accommodate for processability in step B or in the following step C. The residence time for step B is not critical.

Although both thermoset polymers as well as thermoplastic polymers can be used as the matrix of the conductive polymer composition or polymer nano composite, preference is given to the use of a (semi-) crystalline or amorphous thermoplastic polymer.

In one embodiment of the present invention, the sizes of the particles used in step A and B differ. Preferably the average size of the latex particles comprising the conductive polymer (A) is smaller then the average size of the latex particles comprising the non-conductive polymer (B). In a preferred embodiment of the invention the average size of latex particles (A) ranges between 5 nm to 100 nm, preferably between 7 and 50 nm, and the average size of latex particles (B) ranges between 50 nm to 1 μm, preferably between 70 nm and 500 nm. More preferably the ratio of average particle size of latex particles (A) to (B) ranges between 0.01 and 0.3, more preferably between 0.04 and 0.2.

In another embodiment of the invention the conductive polymer (A) flows at a lower temperature then polymer (B), for example because polymer (B) has a higher glass transition temperature and or melting temperature then conductive polymer (A). The easier flowing of conductive polymer (A) is believed to facilitate the formation of a continuous phase of polymer (A) and conductivity.

In yet another embodiment of the invention, the viscosity of the conductive polymer (A) is lower then the viscosity of the non-conductive polymer (B). A large difference in viscosity (measured at the temperature of process step D, in Pa.s) is believed to support the formation of a structure having a continuous phase of conductive polymer (A), especially in the method of the present invention. The viscosity of the conductive polymer (A) is preferably at least a factor 2 lower then the viscosity of the polymer (B) at the temperature of process step D; preferably the viscosity is at least a factor 5 lower, more preferably the viscosity is at least a factor 10 lower.

Combination of one or more of the above embodiments, namely different particles sizes, a lower flowing temperature of polymer (A) and a lower viscosity of polymer (A) is believed to be especially beneficial to arrive at excellent blends of conductive polymer (A), polymer (B) having a high conductivity and excellent percolation threshold.

In step C the mixture obtained in process step B according to the present invention, is treated to remove substantially all of the water. There are different physical methods available to the skilled man to achieve this removal. Out of these methods, preferences for performing step C) are evaporation, freeze-drying, or flash-drying.

In step D the product from step C is heated to a temperature at which at least the matrix forming polymer of step B flows or where the polymer introduced in step B is formed from out of its precursor(s). When in the preceding steps use is made of (a) precursor(s), step D is intended to form the polymer from the precursor(s). In the case that the polymer is a thermoplastic polymer, the temperature in step D is chosen such that it is 10-100° C. above the melting point (in case of a (semi-)crystalline second polymer), or 10-200° C. above the glass transition point in case of an amorphous second polymer introduced in step B. In case that the polymer is a thermoset polymer, the temperature in step D is chosen such, that the polymer can be formed from its precursor(s), during which formation also step E) of the process of the present invention is applied.

In order to make a homogeneous blend of the different polymers pressure may also be applied. In case the polymer present in step B of the process of the present invention has a higher molecular weight, like for example a Mw of more then 500,000, or more than 1,000,000, process step D is preferably performed under a pressure between 1 and 40 MPa, more preferably under a pressure between 5 and 25 MPa.

In a preferred embodiment of the invention, the polymer B has a Mw of at least 500,000 and step D is a compression moulding step, wherein the polymer powder resulting from step C of the process of the invention is heated to a temperature between 125 and 200° C. and a pressure between 1 and 40 MPa, wherein the temperature is 10-100° C. above the melting point (in case of a (semi-) crystalline second polymer), or 10-200° C. above the glass transition point in case of an amorphous second polymer introduced in step B.

In all cases, the man skilled in the art is aware of the process conditions under which step D is to be performed, depending on the nature of the polymer.

Step E in the process of the present invention is the processing and/or solidification of the product of step D in a desired form. Step E) can be a molding step, a pelletizing step, an injection or compression molding step, or any known step to form a solidified polymer object.

The process of the present invention may result in a conductive polymer composition comprising CNTs, wherein the properties of the CNTs used are mainly retained as the CNTs are hardly or not damaged. The CNTs are essentially individually dispersed in the polymer matrix. The polymer therefore has improved stiffness as well as better conductivity properties.

The invention also relates to a conductive polymer composition obtainable by the process of the present invention. With the process of the present invention conductive polymer compositions are obtainable having a percolation threshold at or below 2 wt % of CNT. In particular, the process of the present invention results in a conductive polymer composition with a resistivity of less than $10^6$ Ω/cm at a CNT content of less than 2 wt. %. In the art such a resistivity is only achieved at much higher loadings of the CNT, as is disclosed in (for example) J. Mater. Sci. 37, 2002, pages 3915-23. In this article a process is described for the preparation of a polystyrene/butyl acrylate) copolymer nano composite using CNTs as filler. This process uses multiwall CNTs (MWNT), suspended in an aqueous solution of sodium dodecyl sulphate (SDS), and a latex of the copolymer. An amount of at least 3 wt. % of the MWNT is needed to have a significant change in the electrical conductivity of the nanocomposite.

The percolation threshold of the present invention is surprisingly low, compared to literature data. Reported polythiophene—PS blends prepared via melt blending do not show percolation thresholds in the sense that there is a continuous structure of discrete particles (filler) but show rather a microphase separation. Baytron indicates in its material data (internet) that at least 24 wt % of Baytron is needed to make a conductive film. In a different publication blends have been prepared by melt blending: they reach similar conductivities only for polythiophene loadings between 10 and 20 wt % (Wang, H. L.; Toppare, L.; Fernandez, J. E. *Macromolecules* 1990, 23, (4), 1053-1060) (Hotta, S.; Rughooputh, S. D. D. V.; Heeger, A. J. *Synthetic Metals* 1987, 22, 79-87).

The conductive polymer composition of the present invention can be used for several applications in which the improved percolation threshold and/or conductivity properties can be exploited. Reference can be given to for example shielding applications, for example electromagnetic interference shielding, films, high modulus and on-line paintable conductive body panels for the automotive industry with a better surface appearance than glass fiberfilled polymers, nano-electric devices for example thin-film transistors.

The invention is illustrated by the following non-limiting examples and comparative experiment.

Materials and Techniques

A polystyrene latex was synthesized via conventional free radical emulsion polymerization. The reaction was performed in a RC1 reactor (Mettler Toledo) set at 70° C. and the impeller speed was 400 rpm. The latex was dialysed for 4 days against distilled deionised water (DDI) to remove excess surfactant (a large excess of surfactant was used in the emulsion preparation).

Baytron®P was purchased from H. C. Starck (Bayer®) and contains 0.4 wt % poly(3,4-ethylenedioxythiophene) (PEDOT) and 0.8 wt % poly(styrene sulfonate) (PSS) (relative to the total composition including water). The average size of the latex particles was about 80 nm.

DLS measurements were performed on a Malvern 4700 light scattering apparatus with a 488 nm laser, a Malvern 7032 correlator and a PC27 stepper motor controller. Measurements were performed at 25° C. with a scattering angle of 90°.

Size exclusion chromatography (SEC) was performed on polystyrene prepared using a Waters GPC equipped with a Waters model 510 pump and a model 410 differential refractometer. A set of two mixed bed columns (Mixed-C, Polymer Laboratories, 30 cm, 40° C.) was used. Tetrahydrofuran stabilised with BHT was used as the eluent, and the system was calibrated using narrow molecular weight polystyrene standards ranging from 600 to $7 \times 10^6$ g/mol.

HiPCO® single-walled nanotubes were purchased from Carbon Nanotechnology Inc.

Sonication was performed using a Sonics Vibracell VC750 horn sonicator with a 10 mm tip diameter. The sonication power was maintained at 20W during the exfoliation, and the solution was cooled in an ice-bath to prevent any excessive nanotube damage. Solution volumes for the sonication process were limited to 20 mL and all SWNT weight percentages within these solutions were kept at 0.1 wt % ((relative to the total composition including water)).

UV-Vis spectroscopy was performed on a Hewlett-Packard 8453 spectrometer (range of 200 to 1100 nm). The UV absorbance of the CNT dispersions at a set wavelength was recorded as a function of sonication energy input. The wavelengths of 300 and 400 nm were chosen as these lie outside the absorbance range of the Baytron®P.

Centrifugation of the dispersions was performed on a MSE Mistral 3000E for 15 minutes at 3200 rpm.

Freeze-drying of PS/Baytron®P, PS/SWNT and PS/Baytron®P/SWNT mixed colloids is performed on a Christ Alpha 2-4 drier. Samples are typically dried at 0.25 mbar for 12 hours.

Compression moulding of dried composite powders (remaining after freeze-drying) is performed on a 300G Collins Press. The films are heated at 180° C. for 2 min between two PET sheets, degassed (by opening and closing the compression mould) and twice pressed together for 20 seconds at a pressure of 4 MPa, followed by pressing the powder with 10 MPa for 2 minutes at 180° C. They are allowed to cool to room temperature at atmospheric pressure.

Conductivity measurements are performed via a standard 4-point technique. Graphite contacts are painted on the surface of the compression moulded films, and volume resistivites are measured using a Keithley 6512 programmable electrometer and a Keithely 220 Programmable current source.

EXAMPLE 1

Blends of purchased Baytron®P and prepared PS are prepared. The Baytron®P latex is simply mixed with the PS latex such that the weight percentage of Baytron®P in the final dried polymer blend is between 0 and 6 wt %. The mixed colloid (PS and Baytron®P particles in water) is freeze-dried and then the resultant powder is compression moulded (see method in Materials and techniques) into a homogeneous film. One standard PS latex (prepared via emulsion polymerization, see Materials and techniques) is used for all the composites. The molecular weight distribution of this latex is given in FIG. 1 and the number average particle size as determined by DLS is 64 nm. The number average particle size according to data from the supplier of Baytron®P is in the range of 80 nm. The molecular weight distribution of this polymer can not be determined using SEC due to the insolubility of the polymer in most organic solvents (THF, HFIP, $CHCl_3$, DMF) and water. The suppliers have indicated that the chains are however oligomeric in length.

The conductivity is measured for a series of PS/Baytron®P films (see method in Materials and techniques). The conductivity profile is given in FIG. 2, and a percolation threshold can be identified. The observed percolation threshold is around 2.4 wt % due to a supposed favourable organization of the Baytron®P in the composition.

EXAMPLE 2

In example 2 mixtures have been prepared with SWNT in Baytron (according to the invention) and comparative compositions with SDS as a surfactant. Solutions of 0.4 wt % SDS (comparative) and Baytron®P (according to the invention) were prepared, and SWNTs added such that the SWNT wt % was 0.1 wt % (relative to the total composition including water). The total volume was kept at 20 ml. Sonication was performed and samples removed at appropriate time intervals for UV-Vis spectroscopy analysis. The total sonication time was approximately 1 hour for samples prepared using SDS and 3 hours for samples prepared using Baytron®P. The UV absorbance at 300 nm of all samples is plotted versus the energy supplied through sonication to determine the optimal sonication time and concentration of exfoliated SWNTs (see FIG. 3). This profile proves that Baytron®P can be used to stabilize SWNTs in an aqueous solution as effectively as SDS at the same weight percentages.

Dispersion of HiPCO® SWNTs in SDS solutions is effective as long as the SDS (wt %): SWNT (wt %) is kept above 2:1. Dispersion of HiPCO® SWNTs with Baytron®P as surfactant is effective as long as the Baytron®P:SWNT ratio is at least 4 for a 0.25 wt % SWNT dispersion. SWNT dispersions over 0.4 wt % prove to be difficult to exfoliate completely with Baytron®P as surfactant and thus only dispersions with a maximum of 0.25 wt % SWNTs were investigated.

Centrifugation after the exfoliation step removes most of the catalyst particles and likely some remaining nanotube bundles. The UV spectrum is measured after this step. For both the SDS and Baytron®P stabilized systems, the UV absorbance at 300 nm decreases by 5 to 8% implying that minimal SWNTs are lost in this step. The final SWNT dispersions are further characterized by transmission electron microscopy (TEM).

EXAMPLE 3

The SWNT dispersions prepared in Example 2 are used to prepare SWNT-PS composites via the latex based route. Composites with SWNT loadings of 0.1 to 1.8 wt % are prepared from both the SDS (for comparison) and Baytron®P stabilized SWNTs (according to the invention). One standard polystyrene latex is used for all composites (same latex as used in Example 1, molecular weight distribution given in FIG. 1), and two 0.25 wt % SWNT dispersions are used (one SDS stabilized and one Baytron®P stabilized). The PS latex is added drop-wise to an appropriate volume of SWNT dispersion (such that loading of SWNT in final composite, i.e. polymer, surfactant and SWNT only, is between 0.1 and 1.8 wt %). These mixed colloids are freeze-dried and compression moulded (for method see Materials and techniques) giving a resultant homogeneous film. The conductivity profile of composites prepared with SDS and Baytron®P stabilized SWNTs are given in FIG. 4.

The conductivity is measured for a series of PS/SWNT and PS/Baytron®P/SWNT films (see method in Materials and techniques). The percolation threshold for the composites made with SDS stabilized SWNTs is around 0.4 wt % and that of the Baytron®P SWNTs is around 0.2 wt %. The maximum conductivity level reached is different for the two systems. The presence of the Baytron®P increases the maximum conductivity from 10 (SDS) to 300 S/m.

The invention claimed is:

1. A process for the preparation of a conductive polymer composition comprising the steps:
   (a) providing a latex containing a conductive polymer (A) which includes adding single wall carbon nanotubes dispersed in an aqueous medium to the conductive polymer (A);
   (b) mixing the latex from step (a) with either an aqueous latex of a polymer (B), or with a water-soluble precursor of the polymer (B);
   (c) removing water from the mixture obtained by step (b);
   (d) heating the product from step (c) to a temperature at which the polymer added in step (b) flows or where the polymer, introduced in step (b) is formed from the water-soluble precursor thereof; and
   (e) processing and/or solidifying the product of step (d) into a desired form, wherein
   the amount of the conductive polymer (A) is between 0.1 and 10 wt % relative to the total of components in steps (a) and (b), except water.

2. The process according to claim 1, wherein the polymer (B) has a molecular weight (Mw) which is more than 500,000.

3. The process according to claim 1, wherein the conductive polymer (A) has a viscosity which is at least a factor 2 lower than a viscosity of the polymer (B) at a temperature of process step(d).

4. The process according to claim 1, wherein the conductive polymer (A) flows at a lower temperature than polymer (B).

5. The process according to claim 1, wherein the conductive polymer (A) is selected from the group consisting of poly(3,4ethylenedioxythiophene) poly(styrenesulfonate), polyphenylene-vinylenes, polythiophenes, polyaniline, polypyrrole and polyacetylene.

6. The process according to claim 1 wherein the polymer (B) is selected from the group consisting of polyacrylates, styrene-based (co-) polymers, butadiene- based (co-) polymers, polycarbonate, acrylonitrile-based (co-) polymers, halogen-containing polyolefins, polyamides, polyvinylchloride, polyurethane and PTFE.

7. The process according to claim 1 wherein step (c) is performed by evaporation, freeze-drying, or flash-drying.

8. The process according to claim 1 wherein step (d) is practiced at a temperature which is 10-200° C. above a melting or glass point temperature of the polymer (B).

9. The process according to claim 1, wherein the amount of the carbon nanotubes ranges between 0.1 and 2 wt % relative to the total of components in steps (a) and (b), except water.

10. The process according to claim 1, wherein the conductive polymer (A) is present in an amount to achieve a mass ratio of the conductive polymer (A) to the carbon nanotubes of between 1-10.

11. A process for the preparation of a conductive polymer composition comprising the steps:
(a) providing a latex containing a conductive polymer (A) which includes adding single wall carbon nanotubes dispersed in an aqueous medium to the conductive polymer (A);
(b) mixing the latex from step (a) with either an aqueous latex of a polymer (B) having a molecular weight (Mw) of more than 500,000, or with a watersoluble precursor of the polymer (B);
(c) removing water from the mixture obtained by step (b);
(d) heating the product from step (c) to a temperature at which the polymer (B) added in step (b) flows or where the polymer (B), introduced in step (b), is formed from the water-soluble precursor thereof; and
(e) processing and/or solidifying the product of step (d) into a desired form, wherein the amount of conductive polymer (A) is between 0.1 and 10 wt % relative to the total of components in steps (a) and (b), except water.

12. A process for the preparation of a conductive polymer composition comprising the steps:
(a) providing a latex containing a conductive polymer (A) which includes adding single wall carbon nanotubes dispersed in an aqueous medium to the conductive polymer (A);
(b) mixing the latex from step (a) with either an aqueous latex of a polymer (B), or with a water-soluble precursor of the polymer (B);
(c) removing water from the mixture obtained by step (b); p1 (d) heating the product from step (c) to a temperature which is 10-200° C. above a melting or glass point temperature of the polymer (B), and
(e) processing and/or solidifying the product of step (d) into a desired form, wherein
the amount of conductive polymer (A) is between 0.1 and 10 wt % relative to the
total of components in steps (a) and (b), except water.

* * * * *